United States Patent Office 3,162,660
Patented Dec. 22, 1964

3,162,660
PROCESS FOR PREPARATION OF METAL ACYLATES
Philip H. Crayton, Williamsville, N.Y., assignor to Union Carbide Corporation, a corporation of New York
No Drawing. Filed Feb. 26, 1962, Ser. No. 175,784
11 Claims. (Cl. 260—414)

This invention relates to preparation of metal acylates. More particularly, this invention relates to an improved process for preparing high-purity metal acylates.

Metal acylates possess catalytic properties which are advantageously explored for the polymerization of epoxide compositions into hardened, infusible and insoluble products of relatively high molecular weight. For example, stannic acylates have been found to offer distinct advantages as catalysts for polymerization of epoxides of the polyglycidyl ether type which epoxides have found wide utility in fields of structural reinforcement and insulation. Moreover, metal acylates are useful intermediates for the preparation of other metal-organic compounds.

The presently known methods for the preparation of metal acylates require several successive reaction stages, are slow, and relatively expensive. In addition, it is extremely difficult to obtain a high-purity product. A typical prior art method for the preparation of stannic 2-ethyl hexanoate, for example, comprises a succession of reaction steps that may be summarized as follows:

(1) $2SnCl_4 + 9NaOC_2H_5 \rightarrow NaSn_2(OC_2H_5)_9 + 8NaCl$
(2) $NaSn_2(OC_2H_5)_9 + HCl \rightarrow$
$\quad 2Sn(OC_2H_5)_4 + NaCl + C_2H_5OH$
(3) $Sn(OC_2H_5)_4 + 4(CH_3)_2(C_2H_5)COH \rightarrow$
$\quad Sn[(CH_3)_2(C_2H_5)CO]_4 + 4C_2H_5OH$
(4) $Sn[(CH_3)_2(C_2H_5)CO]_4$
$\quad + 4CH_3(CH_2)_3CH(C_2H_5)COOH \rightarrow$
$\quad Sn[CH_3(CH_2)_3CH(C_2H_5)COO]_4 + 4C_5H_{11}OH$ The stannic ethoxide produced by Reaction 2 is impure presumably due to some hydrolysis and the presence of NaCl. Since it cannot be purified by distillation, it is treated with a tertiary amyl alcohol according to Reaction 3 and the thus obtained $Sn(O\text{-tert.-Am})_4$ is vacuum distilled and subsequently reacted with 2-ethyl hexanoic acid to yield stannic 2-ethyl hexanoate according to Reaction 4. The complexity of this method is readily apparent; however, simpler methods such as a reaction of metal chloride with an acid do not lead to pure end compounds.

It is an object of the present invention to provide a simplified method for the preparation of high-purity metal acylates.

It is another object to provide a method for the preparation of high-purity metal acylates in relatively high yields.

It is still another object to provide a single-stage process for the preparation of a polymerization catalyst for epoxide compositions.

These and other objects will become readily apparent by reference to the ensuing specification and claims.

Broadly, the aforesaid objects are achieved by reacting in a non-polar organic solvent a metal halide selected from the group consisting of trivalent-titanium halide, trivalent-vanadium halide, tetravalent-vanadium halide, tetravalent-tin halide, and tetravalent-zirconium halide with an organic acid having no unsaturation other than benzenoid unsaturation and with a hydrogen halide acceptor at elevated temperatures.

The metal halides that have been found suitable for use as reagents for the process of the invention are those formed with tetravalent tin, trivalent titanium, tetravalent zirconium and trivalent and tetravalent vanadium. Particularly suitable have been found the chlorides of the above named metals.

In some instances a complex metallic salt may be used in lieu of the metal halides. Such a modification can be advantageous in order to minimize possible losses due to the formation of insoluble $MeCl_n \cdot xNH_3$ in the event ammonia is used in the process as the hydrogen halide acceptor. Me is indicative of one of the metals of the above-named group, $n$ is the number of chlorine atoms, and $x$ is the number of ammonia molecules. In the case of tin, for example, hexachlorostannic acid, $H_2SnCl_6$ and its pyridinium salt, $(HPy)_2SnCl_6$, are among the complex compounds suitable for this purpose. Similarly other metal halides, acid metal halides, and organic salts of acid metal halides may be employed.

It has been found that the organic acids must contain from four to eighteen carbon atoms. Suitable organic acids having no unsaturation other than benzenoid unsaturation are the mono-carboxylic alkanoic acids such as n-butyric acid, i-butyric acid, valeric acid, pivalic acid, caproic acid, capric acid, n-caprylic acid, heptanoic acid, 2-ethyl hexanoic acid, nonanoic acid, decanoic acid, undecylic acid, lauric acid, tridecanoic acid, myristic acid, palmitic acid, margaric acid, stearic acid, as well as benzoic acid, phthalic acid, and the like.

Anhydrous ammonia is the preferred hydrogen halide acceptor because of economy, and also because of ease of removal of by product impurities in the reactor. However, acceptors such as $RNH_2$ or $R_2NH$ where R is an alkyl or aryl group may also be employed. Typical such acceptors are ethyl amine and aniline.

The reaction is carried out under essentially anhydrous conditions and in a solvent which does not react with the metal halide employed and does not dissolve the halide formed as byproduct. Non-polar organic solvents containing from 6 to 12 carbon atoms such as liquid aliphatic, liquid aromatic, or liquid halogenated hydrocarbons are suitable solvents. For reasons of convenience benzene is the preferred solvent. Solvents containing active hydrogen or oxygen are generally not suitable.

Similarly, the atmosphere in the reaction vessel should be essentially inert, and free of oxygen, moisture, and hydrogen or other reducing compound. Oxidizing agents such as oxygen tend to convert some of the compounds to $MeO^{++}$ thus providing a source of contamination and yield reduction. Likewise, hydrogen will reduce some of the salts produced and any water present will hydrolyze the salts obtained by the process.

The process temperature must not exceed the thermal decomposition temperature of the reagents and the reaction products. The decomposition temperature for most of the compounds involved is above 140° C., and for all of them above 100° C. For example, the decomposition temperature of $Sn(2\text{-ethyl hexanoate})_4$ is 190° C. and that of $Zr(2\text{-ethyl hexanoate})_4$ is 180° C. Best overall results in the preparation of metal acylates have been obtained at temperatures between about 50° C. and 80° C.

In order to obtain an essentially pure end-product it is required to further avoid the presence of metallic contaminations, as well as of amides and ketones.

Schematically, the following reaction illustrates the process of this invention:

$$MeX_n + nHR + nNH_3 \xrightarrow{\text{solvent}} MeR_n + nNH_4X$$

where Me is one of the metals discussed hereinabove, X is a halogen, HR is one of the organic acids listed above and $n$ indicates the relative stoichiometric amounts of the reagents.

In the case of tin 2-ethyl-hexanoate, for example, the reaction is:

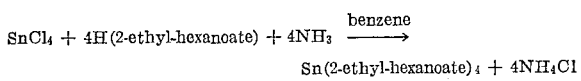

Other typical reactions are:

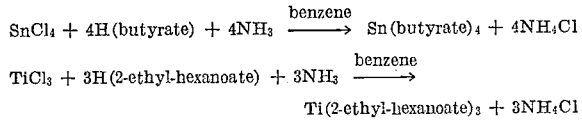

While about stoichiometric amounts of reagents are entirely satisfactory for the purpose of the present invention, it has been found that a very slight excess of the organic acid and the hydrogen halide acceptor is preferable.

The concentration of initial metal halide in the solvent usually varies between about 0.1 mol and about 1 mol, a concentration of between about 0.3 mol and about 0.4 mol being preferred for metal acylates containing between 4 and 10 carbon atoms and a concentration of about 0.1 mol to about 0.3 mol being preferred for metal acylates containing more than 10 carbon atoms.

Overall yields up to about 90 percent are easily obtainable in the process. It is assumed that side reactions such as $MeCl_n + xNH_3 \rightarrow MeCl_n \cdot xNH_3$ are the obstacle in obtaining higher yields. In order to allow complete absorption of $NH_3$ and avoid side reactions, it is advantageous to add $NH_3$ as the last reagent and as slowly as practically possible. Likewise, the removal of byproduct $NH_4Cl$ should be made as promptly as possible to prevent reversal of the reaction and possible Cl and $NH_3$ contamination.

At an operating temperature of about 80° C. a reaction time between about ¼ and about 2 hours is required to complete the conversion and assure highest purities. During said period the solution is generally maintained under reflux. At lower temperature the precipitate becomes less tractable from the filtration standpoint.

A white precipitate of byproduct $NH_4Cl$ is formed. Upon completion of the reaction, the contents of the reaction vessel is filtered under vacuum to remove said byproduct. The filtrate, which contains the corresponding metal acylate and solvent is vacuum evaporated or distilled under vacuum, at a temperature not higher than the decomposition temperature, to remove the solvent.

If an accidental $NH_3$ contamination of the end product occurs, it can be readily remedied by vacuum distillation at an elevated temperature slightly below the decomposition temperature.

The process of the instant invention will be further illustrated by the following examples.

EXAMPLE I

*Preparation of Sn(2-Ethyl Hexanoate)₄*

450 ml. of benzene was placed in a 1 liter flask and brought to reflux under an argon atmosphere. Two solutions were then prepared: 24 ml. (0.2 mol) $SnCl_4$ in 101 ml. of benzene and 127 ml. (0.8 mol) of 2-ethyl-hexanoic acid in 123 ml. of benzene. These two solutions were placed in separate dropping funnels leading to the 1 liter reaction flask. A line was then run from an anhydrous ammonia cylinder through a flow meter and into the refluxing benzene. The three reactants were then added to the reaction flask beginning simultaneously at the following rates: acid 250 ml./hr.; $SnCl_4$ 125 ml./hr.; $NH_3$ 217 ml./min. The reflux temperature was maintained during the addition. The byproduct $NH_4Cl$ was filtered immediately from the hot reaction mixture under an argon atmosphere. The solvent and byproduct $NH_4$ octoate were removed from the product by vacuum distillation at 140 degrees at a pressure of ~3 mm. of Hg.

EXAMPLE II

*Preparation of Zr(2-Ethyl Hexanoate)₄*

74 g. $ZrCl_4$ and 200 ml. 2-ethyl-hexanoic acid were added to 750 ml. of dry benzene under argon. Both the $ZrCl_4$ and the acid dissolved. Gaseous anhydrous $NH_3$ was injected into the solution causing a rise in temperature to 80° C. where refluxing benzene provided temperature control. When the reaction was complete the temperature fell to about 20° C. Subsequently, the white insoluble $NH_4Cl$ byproduct was filtered off. The benzene was removed from the filtrate by vacuum evaporation leaving Zr(2-ethyl hexanoate)₄ as a soft easily melted solid.

EXAMPLE III

*Preparation of V(2-Ethyl Hexanoate)₃*

31 g. $VCl_3$ and 95 ml. 2-ethyl-hexanoic acid were added to 1 liter of benzene under argon. The solution was heated to about 70° C. to dissolve a substantial part of the $VCl_3$ and gaseous anhydrous $NH_3$ was injected into the solution which was maintained at reflux. When $NH_4Cl$ ceased to form, it was filtered from the green solution of V(2-ethyl hexanoate)₃. The benzene was stripped from the product by vacuum evaporation.

EXAMPLE IV

*Preparation of Stannic Butyrate*

11.7 ml. (0.1 mol) $SnCl_4$ and 37 ml. (0.4 mol) butyric acid were dissolved in 500 ml. of dry benzene in an argon-filled 1 liter flask. This solution was heated to 50° C. at which point anhydrous $NH_3$ gas was injected below the surface of the solution. The final temperature of 80° C. was gained after approximately ½ hour when the separation of byproduct $NH_4Cl$ as a white precipitate was complete. The solution was filtered through a glass frit and the filtrate transferred to the 1-liter flask of a vacuum evaporator. Stripping of the benzene and excess acid were accomplished by a final temperature of 130° C. at about 1 mm. of Hg pressure. The recovered stannic butyrate was liquid at 130° C. but was crystallized to white crystals on cooling to room temperature.

EXAMPLE V

*Preparation of Stannic Stearate*

11.7 ml. (0.1) $SnCl_4$ and 116 g. (0.4 mol) stearic acid were dissolved in 500 ml. benzene by heating to 50° C. $NH_3$ gas was injected under the surface of the solution for 1 hour reaching reflux conditions by this time. This served to complete the reaction. Byproduct $NH_4Cl$ was filtered from the solution on a glass frit. The filtrate was transferred to the 1 liter flask of a vacuum evaporator. Benzene was stripped from the product at a final temperature of 80° C. about 10 mm. pressure. The pale yellow product, stannic stearate, was molten at 80° C., and was poured into a storage bottle to solidify by cooling to room temperature.

The foregoing discussion and the examples have been presented by way of illustration only and are not to be construed as limitations of the present invention. Other modifications and embodiments may be resorted to without departing from the scope of the invention.

I claim:

1. A process for preparation of metal acylates which comprises reacting, in a non-polar organic solvent, a metal halide selected from the group consisting of trivalent-titanium chloride, trivalent-vanadium chloride, tetravalent-vanadium chloride, tetravalent-tin chloride, and tetravalent-zirconium chloride with an organic acid having from 4 to 18 carbon atoms and selected from the group consisting of a monocarboxylic alkanoic acid, benzoic acid, and phthalic acid, and with anhydrous ammonia at elevated temperatures, but below the thermal decomposition temperature of the resulting reaction product and while maintaining an essentially inert atmosphere in the reaction vessel, and thereafter recovering the metal acylates from the reaction product.

2. Process of claim 1 wherein the metal chloride is tetravalent-tin chloride.

3. Process of claim 1 wherein the metal chloride is tetravalent-zirconium chloride.

4. Process of claim 1 wherein the metal chloride is trivalent-titanium chloride.

5. Process of claim 1 wherein the metal chloride is trivalent-vanadium chloride.

6. Process of claim 1 wherein the metal chloride is tetravalent-vanadium chloride.

7. Process for preparation of stannic 2-ethyl hexanoate which comprises reacting in a benzene solution stannic chloride with at least stoichiometric amounts of 2-ethyl hexanoic acid and anhydrous ammonia at temperatures between about 50° C. and 80° C. and while maintaining an essentially inert atmosphere in the reaction vessel, and subsequently recovering stannic 2-ethyl hexanoate from the reaction product.

8. Process for preparation of stannic butyrate which comprises reacting in a benzene solution stannic chloride with at least stoichiometric amounts of butyric acid and anhydrous ammonia at temperatures between about 50° C. and 80° C. and while maintaining an essentially inert atmosphere in the reaction vessel, and subsequently recovering stannic butyrate from the reaction product.

9. Process for preparation of stannic stearate which comprises reacting in a benzene solution stannic chloride with at least stoichiometric amounts of stearic acid and anhydrous ammonia at temperatures between about 50° C. and 18° C. and while maintaining an essentially inert atmosphere in the reaction vessel, and subsequently recovering stannic stearate from the reaction product.

10. Process for preparation of zirconium 2-ethyl hexanoate which comprises reacting in benzene solution zirconium chloride with at least stoichiometric amounts of 2-ethyl hexanoic acid and anhydrous ammonia at temperatures between about 50° C. and 80° C. and while maintaining an essentially inert atmosphere in the reaction vessel, and subsequently recovering zirconium 2-ethyl hexanoate from the reaction product.

11. Process for preparation of vanadium 2-ethyl hexanoate which comprises reacting in a benzene solution vanadium chloride with at least stoichiometric amounts of 2-ethyl hexanoic acid and anhydrous ammonia at temperatures between about 50° C. and 80° C. and while maintaining an essentially inert atmosphere in the reaction vessel, and subsequently recovering vanadium 2-ethyl hexanoate from the reaction product.

References Cited in the file of this patent
UNITED STATES PATENTS

| | | |
|---|---|---|
| 2,018,811 | Schmidt | Oct. 29, 1935 |
| 2,132,997 | Plechner | Oct. 11, 1938 |
| 2,393,934 | Reiff et al. | Jan. 2, 1946 |
| 2,480,823 | Morris et al. | Sept. 6, 1949 |
| 2,739,905 | Mack et al. | May 27, 1956 |